(12) United States Patent
Daniels et al.

(10) Patent No.: US 12,264,956 B2
(45) Date of Patent: Apr. 1, 2025

(54) SYSTEM AND METHOD FOR WEIGHING FRAC SAND

(71) Applicant: SPM OIL & GAS INC., Fort Worth, TX (US)

(72) Inventors: Jeffery Shaun Daniels, Yukon, OK (US); Eric Robert Iwasenko, Oklahoma City, OK (US); Andres Felipe Perilla, Yukon, OK (US)

(73) Assignee: SPM OIL & GAS INC., Fort Worth, TX (US)

( * ) Notice: Subject to any disclaimer, the term of this patent is extended or adjusted under 35 U.S.C. 154(b) by 332 days.

(21) Appl. No.: 18/047,695

(22) Filed: Oct. 19, 2022

(65) Prior Publication Data

US 2024/0133733 A1 Apr. 25, 2024
US 2024/0230396 A9 Jul. 11, 2024

(51) Int. Cl.
*G01G 17/06* (2006.01)
(52) U.S. Cl.
CPC ..................... *G01G 17/06* (2013.01)
(58) Field of Classification Search
CPC ................ G01G 17/04; G01G 17/06
See application file for complete search history.

(56) References Cited

U.S. PATENT DOCUMENTS

| | | | |
|---|---|---|---|
| 2,887,174 A | 5/1959 | Ray | |
| 3,467,281 A | 9/1969 | Curtis | |
| 9,199,278 B2 | 12/2015 | Scott et al. | |
| 9,260,253 B2 | 2/2016 | Naizer et al. | |
| 9,297,246 B2 | 3/2016 | Smartt et al. | |
| 10,188,970 B1* | 1/2019 | LoCascio | B01D 33/11 |
| 2015/0343343 A1* | 12/2015 | DeWaard | B01D 33/72 |
| | | | 210/380.1 |
| 2020/0378815 A1 | 12/2020 | Jiang et al. | |
| 2021/0077923 A1 | 3/2021 | Carlson et al. | |
| 2021/0131256 A1* | 5/2021 | Coombe | B01D 29/35 |
| 2021/0363029 A1* | 11/2021 | Johns | B01D 21/302 |
| 2024/0375028 A1* | 11/2024 | Dach | B01D 33/11 |

* cited by examiner

*Primary Examiner* — Natalie Huls

(57) ABSTRACT

A system is provided that comprises an inlet fluid conduit, an outer frame, and an inner frame coupled to the outer frame via at least one mass measurement device, where the inner frame includes an opening. A bi-directional scale is pivotally connected to the inner frame along an axis of rotation, where the bi-directional scale comprises filter media positioned between a first material receiving receptable and a second material receiving receptable. The first material receiving receptacle is configured to receive a fluid mixture from the inlet fluid conduit. The system comprises a separator pivoting system coupled to the bi-directional scale. The separator pivoting system is configured to: rotate the bi-directional scale about the axis of rotation, wherein following rotation of the bi-directional scale, the second material receiving receptacle is positioned to receive the fluid mixture from the inlet fluid conduit.

20 Claims, 6 Drawing Sheets

SYSTEM AND METHOD FOR WEIGHING FRAC SAND

TECHNICAL FIELD

The present disclosure relates generally to frac flowback operations, more specifically to a system and method for weighing frac sand.

BACKGROUND

Subsurface rock units (e.g., organic shale) may contain hydrocarbons such as oil, natural gas, and/or natural gas liquids that will not flow freely to an oil and gas well. Fracturing operations allow access to the hydrocarbons by generating fractures in the rock. For example, fracturing operations may include generating a well, sealing a portion of the well in a petroleum-bearing zone, and pumping water under high pressure into the sealed portion. A mixture of water, frac sand, chemicals and/or thickeners may be pressurized in the sealed portion to fracture the rock units. Frac sand is crush resistant and holds fractures in the rock unit open to facilitate flow to the well. The chemicals and/or thickeners create a viscous gel that facilitates the water to carry particulate matter (e.g., frac sand, earth, etc.) and hydrocarbons in suspension, which can be drawn out through the well.

During frac flowback operations, it is desirable to measure the quantity and rate of return of frac sand.

SUMMARY

The systems and methods of the present disclosure provide several technical advantages over previous technology for isolating and measuring a quantity of frac sand received from an upstream sand separator, which include: (1) improved separation efficiency and mechanical actuation via a bi-directional scale that is rotatable about an axis of rotation; (2) self-cleaning filter media that reduces or eliminates downtime between batches; (3) improved accuracy and automatic measurement of particulate matter mass in frac flowback; and (4) improved corrosion resistance.

In one embodiment, the present disclosure provides a system comprising an inlet fluid conduit, an outer frame, and an inner frame coupled to the outer frame via at least one mass measurement device, where the inner frame includes an opening. The system comprises a bi-directional scale pivotally connected to the inner frame along an axis of rotation, where the bi-directional scale comprises filter media positioned between a first material receiving receptable and a second material receiving receptable opposite the first material receiving receptacle. The first material receiving receptacle is configured to receive a fluid mixture from the inlet fluid conduit, where the filter media separates the received fluid mixture into particulate matter that is retained by the filter media, in the first material receiving receptacle and filtrate that passes through the filter media. The system comprises a separator pivoting system coupled to the bi-directional scale. The separator pivoting system is configured to: rotate the bi-directional scale about the axis of rotation, wherein following rotation of the bi-directional scale, the second material receiving receptacle is positioned to receive the fluid mixture from the inlet fluid conduit.

In another embodiment, the present disclosure provides a system comprising an outer frame, an inlet fluid conduit coupled to the outer frame, and an inner frame coupled to the outer frame via at least one mass measurement device, where the inner frame has an opening. The system comprises a bi-directional scale pivotally connected to the inner frame along an axis of rotation. The bi-directional scale comprises a first material receiving receptacle and a second material receiving receptacle opposite the first material receiving receptacle. The bi-directional scale comprises filter media positioned between the first material receiving receptacle and the second material receiving receptacle. The system comprises a separator pivoting system. The separator pivoting system comprises an actuator and a processor, where the processor is configured to rotate the bi-directional scale along the axis of rotation using the actuator.

In one embodiment, the present disclosure provides a method comprising receiving a fluid mixture in a bi-directional scale from an inlet conduit. The bi-directional scale comprises filter media positioned between a first material receiving receptacle and a second material receiving receptacle positioned opposite the first material receiving receptacle. The first material receiving receptacle is configured to receive the fluid mixture from the inlet conduit. The method further comprises separating the fluid mixture into particulate matter and filtrate via the filter media, where at least a portion of the particulate matter is retained by the filter media, in the first material receiving receptacle and the filtrate passes through the filter media. The method comprises recording the mass of the particulate matter using at least one mass measuring device and rotating the bi-directional scale about an axis of rotation to dispense the particulate matter retained in the first material receiving receptacle. Following rotation of the bi-directional scale, the second material receiving receptacle is configured to receive the fluid mixture from the inlet fluid conduit.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
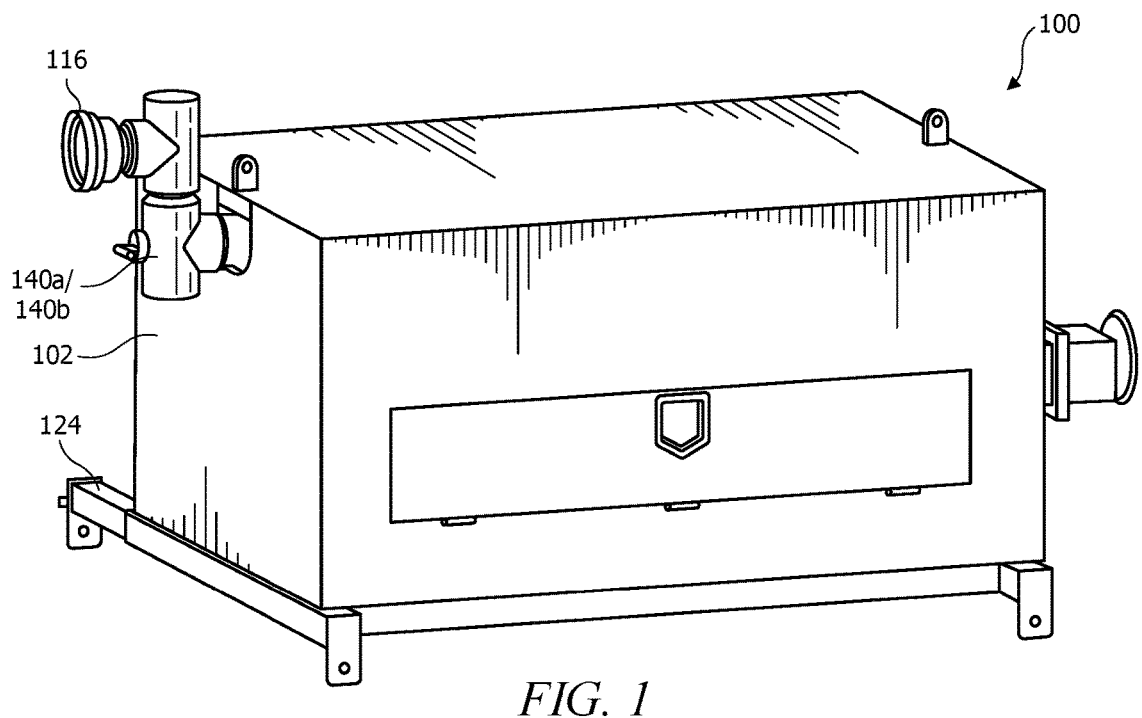
FIG. 1 is a perspective view of a system configured to separate a fluid mixture according to some embodiments of the present disclosure.
Figure 2:
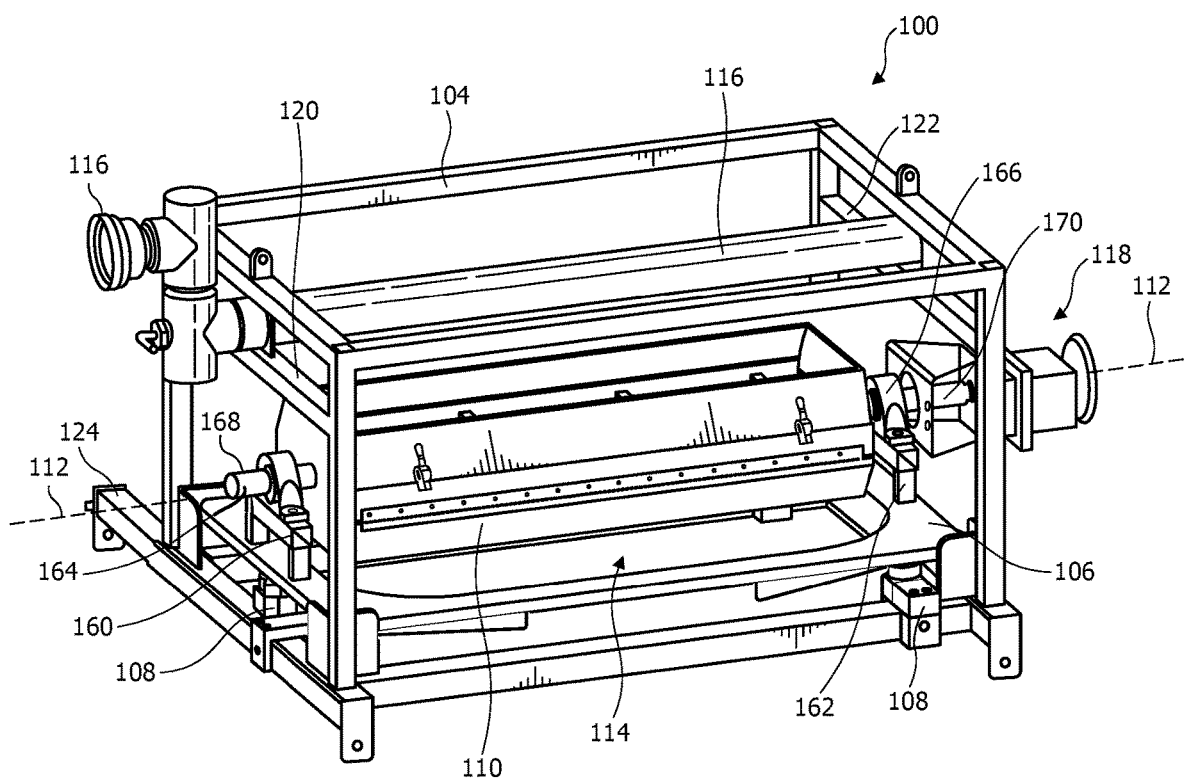
FIG. 2 is a perspective view of the system of FIG. 1 with the cover removed according to some embodiments of the present disclosure.

FIGS. 1 and 2 are schematic diagrams of an embodiment of a system 100 that is configured for isolating and measuring a quantity of frac sand from a fluid mixture. FIG. 1 illustrates the system 100 with a cover 102 and FIG. 2 illustrates the system 100 with the cover 102 removed. As shown in FIG. 2, the system 100 includes an outer frame 104, an inner frame 106 coupled to the outer frame 104 via at least one mass measurement device 108. The system 100 includes a bi-directional scale 110 pivotally connected to the inner frame 106 about an axis of rotation 112, where the inner frame 106 includes at least one opening 114 positioned below the bi-directional scale 110. The opening 114 may be oriented in a horizontal direction. The opening 114 may extend lengthwise parallel to the axis 112. The opening 114 may be aligned with an opening in the outer frame 106. A length and width of the opening 114 may be greater than a corresponding length and width of the bi-directional scale 110 to allow unobstructed passage, of material from the bi-directional scale 110, therethrough. An inlet fluid conduit 116 is configured to transport the fluid mixture from a fluid source (e.g., a frac flowback separator) to the bi-directional scale 110. The system 100 includes a separator pivoting system 118 configured to rotate the bi-directional scale 110 about the axis of rotation 112.

The outer frame 104 may have any suitable geometry but in the illustrated embodiment, the outer frame 104 has a cubic frame that comprises a first support beam 120 and a second support beam 122, each extending across opposing faces of the cubic frame. In one embodiment, the inlet fluid conduit 116 is coupled to the first support beam 120 and the second support beam 122. The outer frame 104 includes telescopic adjustable legs 124 that extend and contract. The telescopic adjustable legs 124 may be selectively sized to fit on top of a storage container. The telescopic adjustable legs 124 may also include fixtures (e.g., brackets and bolts) for coupling the telescopic adjustable legs 124 to the storage container in a desired location.

Figure 3:
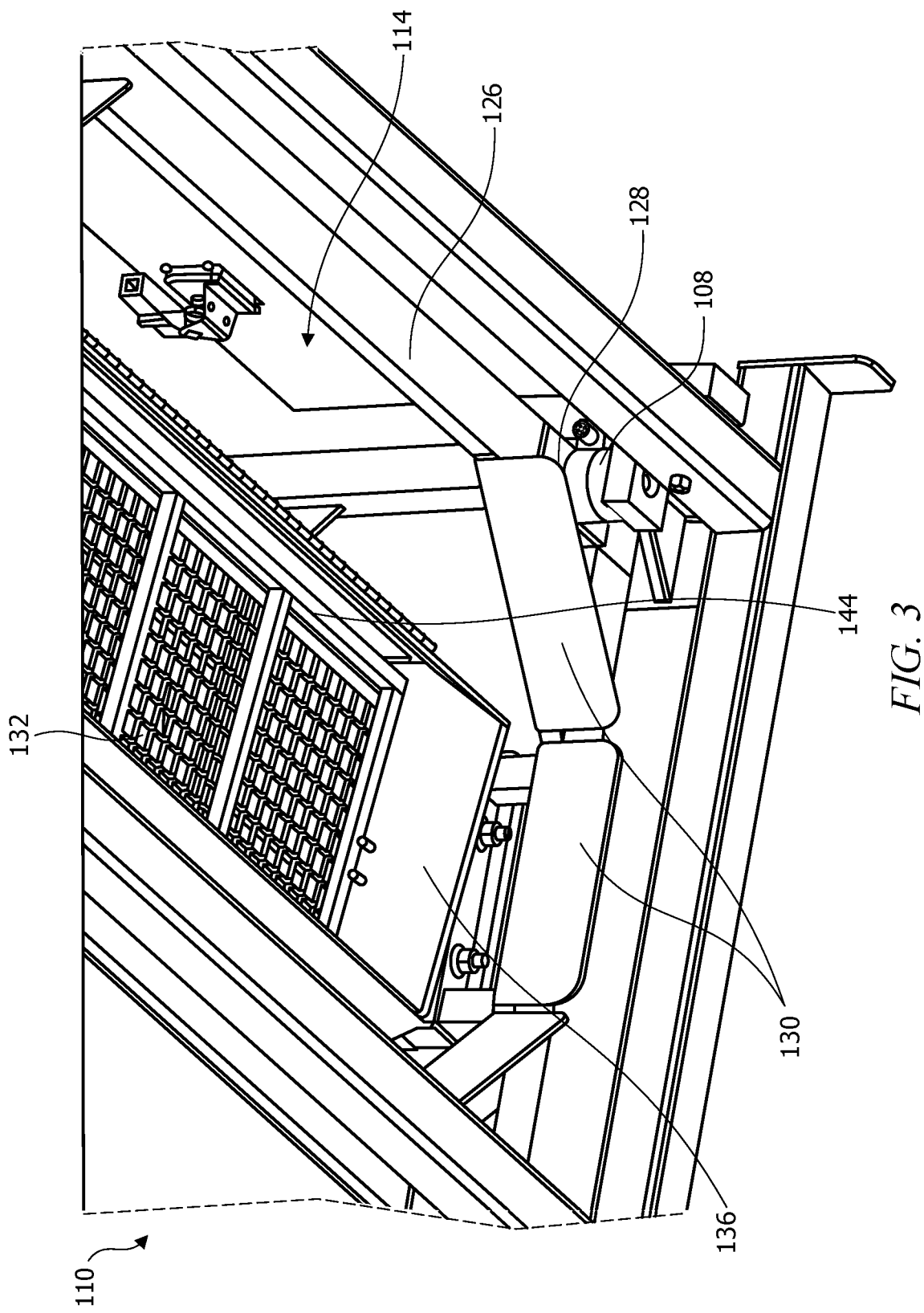
FIG. 3 is a bottom, perspective view of the system of FIG. 1 illustrating at least one mass measurement device and splash guards according to some embodiments of the present disclosure.

In the illustrated embodiment, the inner frame 106 is coupled to the outer frame 104 via three mass measurement devices 108 orientated in a triangular formation. Although any number of mass measurement devices (e.g., 1, 2, 10, etc.) may be used to couple the outer frame 104 to the inner frame 106, the triangular or tripod formation provides good stability against gravitational loads. As shown in FIG. 3, a bottom surface 126 of the inner frame 104 includes a recess 128 that is configured to receive a portion of a mass measurement devices 108. The bottom surface 126 of the inner frame 104 may include a corresponding recess 128 for each mass measurement device 108.

Coupling the mass measurement devices 108 into the corresponding recesses of the inner frame 104 helps to secure the outer frame 102 to the inner frame 104, and provides improved stability against horizontal shear forces. The at least one mass measurement device 108 is configured to record a mass of material in the bi-directional scale 110. Any suitable mass measurement device 108 may be used including, but not limited to, a load cell, a mass transducer, a balance, a scale, a strain gauge, or combinations thereof.

As shown in FIG. 3, the bi-directional scale 110 may include at least one splash guard 130 that projects downward from the bottom surface 126 of the inner frame 104. The splash guard(s) 130 is positioned between the opening 114 in the inner frame 104 and the mass measurement device(s) 108. For example, the splash guard(s) 130 may be coupled to an inner edge of the opening 114. Splash guard(s) 130 may be positioned in this manner for each mass measurement device 108 in the system 100. The splash guard(s) 130 reduces or eliminates the exposure of fluids and material to the mass measurement device(s) 108 during operation of the system 100.

Figure 4:
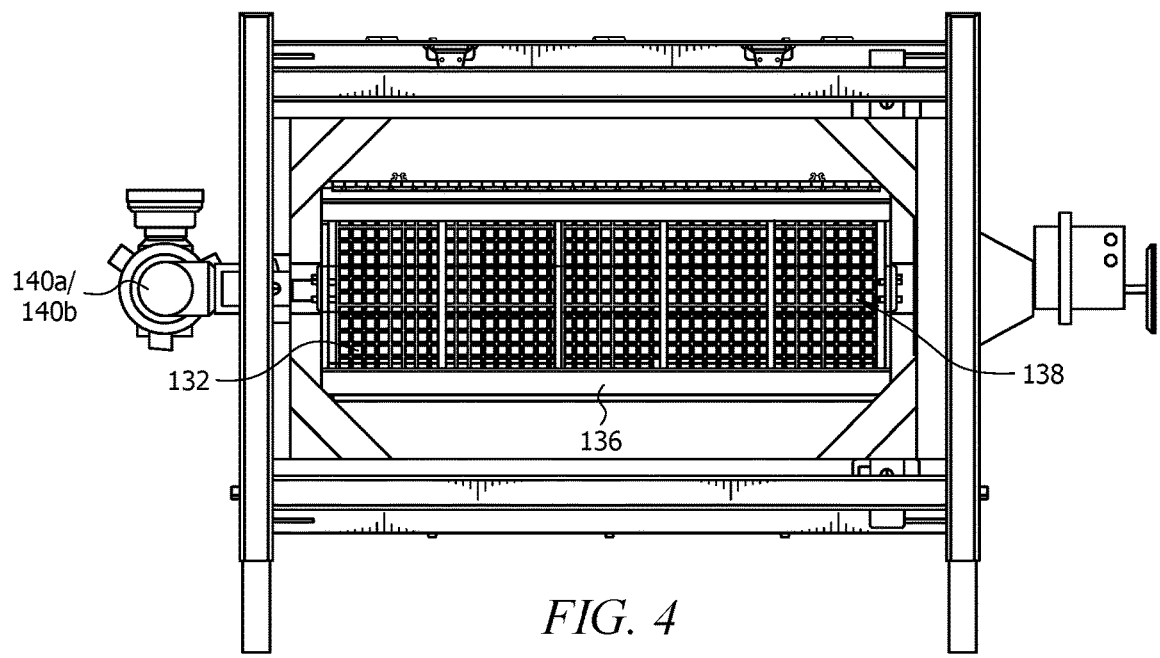
FIG. 4 is a bottom view of the system of FIG. 1 illustrating an inlet fluid conduit and a bi-directional scale according to some embodiments of the present disclosure.
Figure 5:
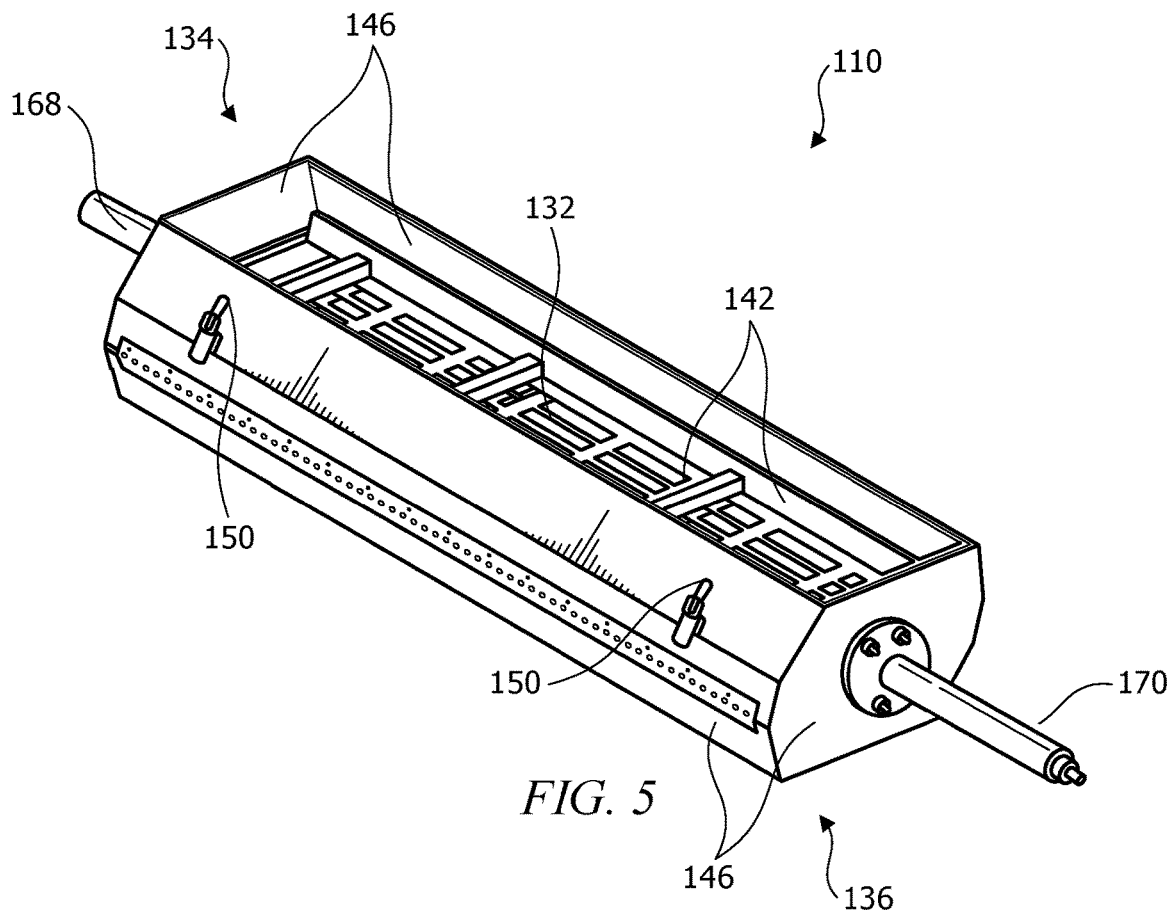
FIG. 5 is a perspective view of a bi-directional scale according to some embodiments of the present disclosure.
Figure 6:
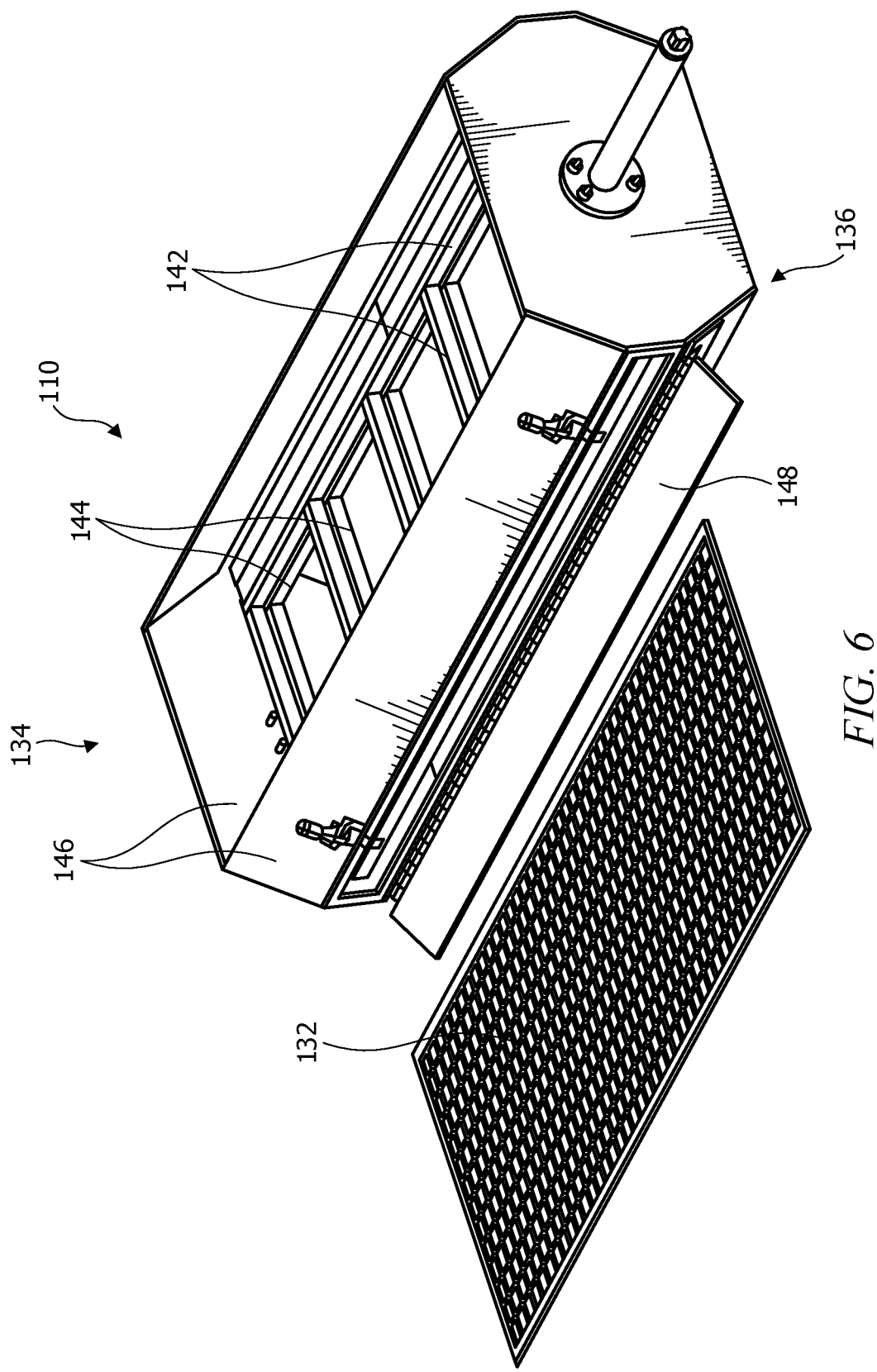
FIG. 6 is a perspective view of the bi-directional scale of FIG. 5 with the filter media slidable removed from the bi-directional scale.

Referring to FIGS. 4-6, the bi-directional scale 110 includes filter media 132 positioned between a first material receiving receptacle 134 and a second material receiving receptacle 136 positioned opposite the first material receiving receptacle 134. The first material receiving receptacle 134 is configured to receive a fluid mixture from an opening 138 in the inlet fluid conduit 116. In some embodiments, the opening 138 is positioned above the bi-directional scale 110 and forms a slit in the inlet fluid conduit 116 that extends the length of the bi-directional scale 110 or approximately the length of the bi-directional scale 110 (e.g., between 50% to 95% the length of the bi-directional scale 110). In one embodiment, a valve 140a is positioned in the inlet fluid conduit 116 to regulate the flow of the fluid mixture to the bi-directional scale 110. In another embodiment, a t-shaped pipe fitting 140b is positioned in the inlet fluid conduit 116 to regulate the flow of the fluid mixture. The filter media 132 separates the received fluid mixture into particulate matter that is retained by the filter media 132 and filtrate that passes through the filter media 132. In some embodiments, the filter media 132 may be a mesh screen or a non-woven filter.

The system 100 may be configured to separate any fluid mixture containing particulate matter, but is particularly advantageous for separating fluid mixtures received from a frac flowback separator. Exemplary compositions of fluid mixtures to be separated by the system 100 may comprise frac sand, earth, water, residual hydrocarbons, chemicals and/or thickeners utilized in fracturing operations.

In some embodiments, the filter media 132 is positioned between a first porous support structure 142 and a second porous support structure 144. The first porous support structure 142 forms a floor surface in the first material receiving receptacle 134 and the second porous support structure 144 forms a floor surface in the second material receiving receptacle 136. In some embodiments, the first and second porous support structure 142, 144 are grates that help support the gravitation load that the filter media 132 experiences during operation. Each of the first material receiving receptacle 134 and the second material receiving receptacle 136 includes side walls 146 that extend from or surround the first and second porous support structures 142, 144, respectively. The side walls 146 may be slanted at an angle towards the center of the bi-directional scale 110. Slants in the side walls 146 help to reduce the amount of fluid mixture that splashes outside of the bi-directional scale 110 during operation.

Figure 7:
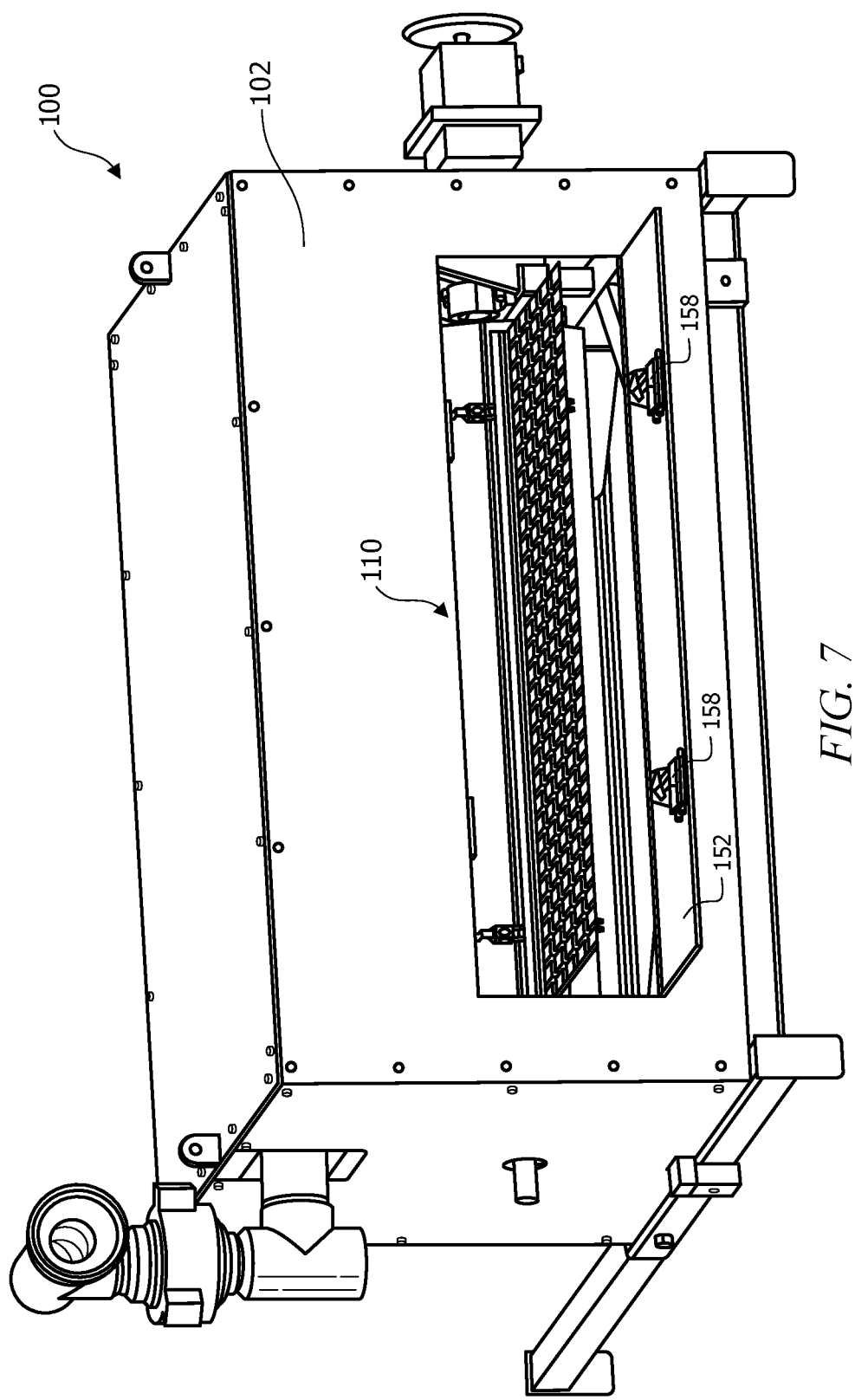
FIG. 7 is a front, perspective view of a system having a cover with a service door that allows replacement of filter media in a bi-directional scale according to some embodiments of the present disclosure.

Referring to FIGS. 6-7, the filter media 132 may slide in between the first porous support structure 142 and the second porous support structure 144. The filter media 132 may also slide in and out of the bi-directional scale 110 via an openable and closable door 148. Referring to FIG. 5, latches 150 may be configured to move the door 148 between a closed and open position. Referring to FIG. 7, the cover 102 may include an openable and closable service door 152 that allows access to the door 148 of the bi-directional scale 110. Latches 158 may be configured to alter the door 152 between a closed and open position. The doors 148, 152 may be opened to allow access to the filter media 132 so that the filter media 132 can be removed from the bi-directional scale 110 for replacement or cleaning.

Figure 8:
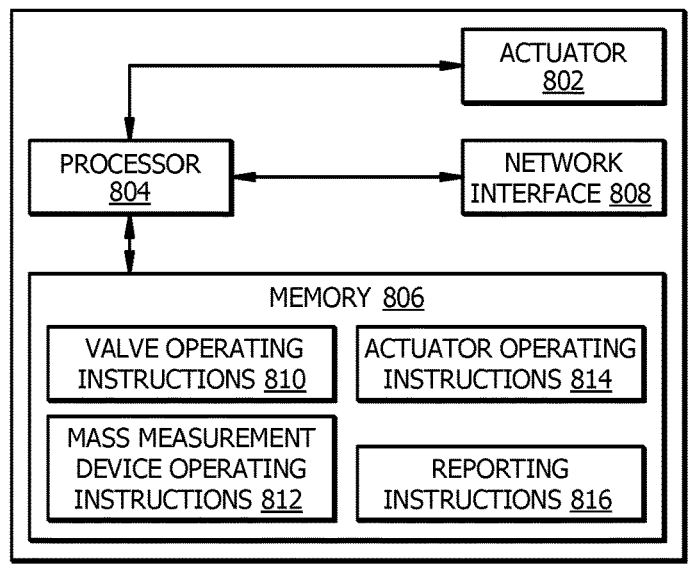
FIG. 8 is a schematic diagram of a separator pivoting system according to some embodiments of the present disclosure.

In some embodiments, the outer frame 104, the inner frame 106 and the bi-directional scale 110 may comprise aluminum, particularly Al 6061-T6, or stainless steel. Aluminum and stainless steel offer advantages in reducing corrosion that is caused under the harsh and wet conditions imparted by fluid mixtures of the process. Referring back to FIG. 8, the separator pivoting system 118 may include an actuator 802, a processor 804, a memory 806, and a network interface 808. Although not illustrated in FIG. 8, the separator pivoting system 118 may be communicatively coupled to various other components in the system 100, including but not limited to the at least one mass measurement device 108 and the valve 140a, as well as sensors used to monitor process operation (e.g., pressure sensors, temperature sensors, flow rate sensors). Referring momentarily to FIG. 6, the separator pivoting system 118 further comprises a first bearing frame 160 and a second bearing frame 162 each coupled to the inner frame 106 and positioned on opposite sides of the bi-directional scale 110. Each of the first and second bearing frames 160, 162 includes a respective bearing 164, 166 and rotatable shaft 168, 170, where the rotatable shaft 168, 170 is coupled to the bi-directional scale 110. The actuator 802 in the separator pivoting system 118 is coupled to at least one of the rotatable shafts 168, 170 such that the actuator 802 may rotate the bi-directional scale 110 along the axis of rotation 112 based on instructions received from the memory 806. Any suitable actuator 802 may be used including, but not limited to, an electronic actuator, hydraulic actuator, pneumatic actuator, or combinations thereof.

Referring back to FIG. 8, the processor 804 is communicatively coupled to and in signal communication with the actuator 802, the memory 806, and the network interface 802. The processor 804 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 804 may be a programmable logic device, a microcontroller, a microprocessor, or any suitable combination of the preceding. The processor 804 is configured to process data and may be implemented in hardware or software. For example, the processor 804 may be 8-bit, 16-bit, 32-bit, 64-bit or of any other suitable architecture. The processor 804 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processors 804 is configured to implement various instructions. For example, the processor 804 is configured to execute instructions to implement the function disclosed herein. In some embodiments, the function described herein is implemented using logic units, FPGAs, ASICs, DSPs, or any other suitable hardware or electronic circuitry.

The memory 806 is operable to store any of the information for operating the system 100, along with any other data, instructions, logic, rules, or code operable to execute the function described herein. For example, the memory 806 may store various code including valve operating instructions 810, mass measurement device operating instructions 812, actuator operating instructions 814, and reporting instructions 816 for displaying operation parameters (dump cycle time, cycle time remaining, valve open time, pressure of inlet fluid conduit, etc.) and output parameters (e.g., last recorded mass, accumulated mass, etc.). The memory 806 may be volatile or non-volatile and may comprise read-only memory (ROM), random-access memory (RAM), ternary content-addressable memory (TCAM), dynamic random-access memory (DRAM), and static random-access memory (SRAM).

The network interface 808 is configured to enable wired and/or wireless communications. The network interface is configured to communicate data between the system 100 and other network devices, systems, or domain(s). For example, the network interface 808 may comprise a WIFI interface, a local area network (LAN) interface, a wide area network (WAN) interface, a modem, a switch, or a router. The processor 804 is configured to send and receive data using the network interface 808. The network interface 808 may be configured to use any suitable type of communication protocol as would be appreciated by one of ordinary skill in the art.

In operation, the processor 804 may instruct the at least one mass measurement device 108 to tare the mass of components in the bi-directional scale 110 prior to operation or otherwise obtain a pre-recorded mass of the bi-directional scale 110. In some embodiments, the processor 804 may instruct the valve 140a to open and regulate the flow rate of the fluid mixture through the inlet fluid conduit 116 to the first material receiving receptacle 134 of the bi-directional scale 110.

In some embodiments, the processor 804 may instruct the valve 140a to open periodically based on a cycle timer. For example, the cycle timer may occur every one minute, every five minutes, every 10 minutes, every 20, every 30 minutes, every 40 minutes, every 50 minutes, every hour, every two hours, every three hours, every four hours, every five hours, every six hours, or every 12 hours. In some embodiments, the processor 804 may instruct the valve 140a to open based on a trigger event or a set-point measurement of an upstream process unit. For example, an upstream frac flowback separator may reach a set-point measurement (e.g., a set-point temperature, a set-point pressure, a set-point mass, etc.) that initiates the valve 140a to open. In some embodiments, the valve 140a remains open for a specified duration to fill the first material receiving receptacle 134.

The processor 804 may instruct the valve 140a to close to allow the filter media 132 to separate the fluid mixture into particulate matter and filtrate within the first material receiving receptacle 134. The filtrate during this time passes through the opening 114 in the inner frame 106 and exits the system 100. The fluid mixture may be allowed to separate over a specified separation duration. Suitable separation durations may range from 30 seconds to 24 hours. For example, the separation duration may be at least 30 seconds, at least 1 minute, at least 2 minutes, at least 3 minutes, at least 4 minutes, at least 5 minutes, less than 6 minutes, less than 7 minutes, less than 8 minutes, less than 9 minutes, less than 10 minutes, less than 30 minutes, less than an hour, less than six hours, less than 12 hours, or less than 24 hours. In some embodiments, the processor 804 instructs the one or more mass measurement device 108 to record the mass of particulate matter remaining in the first material receiving receptacle 134.

In some embodiments, following the separation duration, the processor 804 instructs the separator pivoting system 118 to rotate the bi-directional scale 110 about the axis of rotation 112 to dispense the particulate matter from the first material receiving receptacle 134 through the opening 114. Alternatively, the dump cycle may be initiated based on a set-point mass of particulate matter accumulated in the first material receiving receptacle 134 within a threshold (e.g., ±0.1% to 10% of the set-point mass). For example, the dump cycle may be initiated once the set-point mass has been recorded by the at least one mass measuring device 108. In some embodiments, the processor 804 instructs the separator pivoting system 118 to rotate the bi-directional scale 110 once the at least one mass measuring device 108 records a stable mass of the particulate matter in the first material receiving receptacle 134, e.g., the mass remains within 0.1% to 3% of the previous reading(s) over a duration. The stabilized mass may be an indication that filtration has ceased. Once the set-point mass or a stabilized mass has been recorded, the processor 804 may instruct the separator pivoting system 118 to rotate the bi-directional scale 110 about the axis of rotation to dispense the particulate matter from the first material receiving receptacle 134 through the opening 114.

Following rotation of the bi-directional scale 110, the second material receiving receptacle 136 is positioned to receive the fluid mixture from the inlet fluid conduit 116, e.g., the bi-directional scale 110 becomes inverted. The processor 804 may repeat the process using the second material receiving receptacle 136. For example, the processor 804 may instruct one or more mass measuring device 108 to tare the mass of components in the bi-directional scale 110 prior to operation or otherwise obtain a pre-recorded mass of the bi-directional scale 110. The processor 804 may then instruct the valve 140a to remain open and regulate the flow rate of the fluid mixture through the inlet fluid conduit 116 to the second material receiving receptacle 136 of the bi-directional scale 110.

In some embodiments, the processor 804 may instruct the valve 140a to open periodically based on the cycle timer. For example, the cycle timer occur every one minute, every five minutes, every 10 minutes, every twenty minutes to an hour, e.g., every 20 minutes, every 30 minutes, every 40 minutes, every 50 minutes, every hour, every two hours, every three hours, every four hours, every five hours, every six hours, or every 12 hours. In some embodiments, the processor 804 may instruct the valve 140a to open based on a trigger event or a set-point measurement of an upstream process unit. For example, an upstream frac flowback separator may reach a set-point measurement (e.g., a set-point temperature, a set-point pressure, a set-point mass, etc.) that initiates the valve 140a to open. In some embodiments, the valve 140a remains open for a specified duration to fill the second material receiving receptacle 136.

The processor 804 may instruct the valve 140a to close to allow the filter media 132 to separate the fluid mixture into particulate matter and filtrate within the second material receiving receptacle 136. The filtrate during this time passes through the opening 114 in the inner frame 106 and exits the system 100. The fluid mixture may be allowed to separate over a specified separation duration. Suitable separation durations may range from 30 seconds to 24 hours. For example, the separation duration may be at least 30 seconds, at least 1 minute, at least 2 minutes, at least 3 minutes, at least 4 minutes, at least 5 minutes, less than 6 minutes, less than 7 minutes, less than 8 minutes, less than 9 minutes, less than 10 minutes, less than 30 minutes, less than an hour, less than six hours, less than 12 hours, or less than 24 hours. In some embodiments, the processor 804 instructs the one or more mass measurement device 108 to record the mass of particulate matter remaining in the second material receiving receptacle 136. In some embodiments, following the separation duration, the processor 804 instructs the separator pivoting system 118 to rotate the bi-directional scale 110 about the axis of rotation to dispense the particulate matter from the second material receiving receptacle 136 through the opening 114. Alternatively, the dump cycle may be initiated based on a set-point mass of particulate matter within a threshold (e.g., ±0.1% to 10% of the set-point mass) accumulated in the second material receiving receptacle 136. For example, the dump cycle may be initiated once the set-point mass of particulate matter has been recorded by the at least one mass measuring device 108. In some embodiments, the processor 804 instructs the separator pivoting system 118 to rotate the bi-directional scale 110 once the at least one mass measuring device 108 records a stable mass of the particulate matter in the second material receiving receptacle 136, e.g., the mass remains within 0.1% to 3% of the previous reading(s) over a duration. Once the set-point mass or a stabilized mass of particulate matter has been recorded, the processor 804 may instruct the separator pivoting system 118 to rotate the bi-directional scale 110 about the axis of rotation to dispense the particulate matter from the second material receiving receptacle 136 through the opening 114. Following rotation of the bi-directional scale 110, the first material receiving receptacle 134 is positioned to receive the fluid mixture from the inlet fluid conduit 116, e.g., the bi-directional scale 110 becomes inverted. This process may be repeated any number of times as desired.

The aforementioned process offers advantages over conventional separation systems. For example, by repeatedly rotating or inverting the filter media 132 between cycles, subsequent delivery of the fluid mixture self-cleans the filter media 132. That is, particulate matter may become entrained on the filter media 132, where in certain instances, not all particulate matter is removed from the filter media 132 following inversion of the bi-directional scale 110. By delivering the fluid mixture on an opposing side of the filter media 132 in the subsequent dump cycle, filtrate passing through the filter media 132 removes particulate matter that may have become entrained on the opposing surface of the filter media 132. The self-cleaning feature and bi-directional functionality of the separator 110 reduces servicing periods that impart downtime associated with cleaning the filter media 132.

Example Method of Operation

Figure 9:
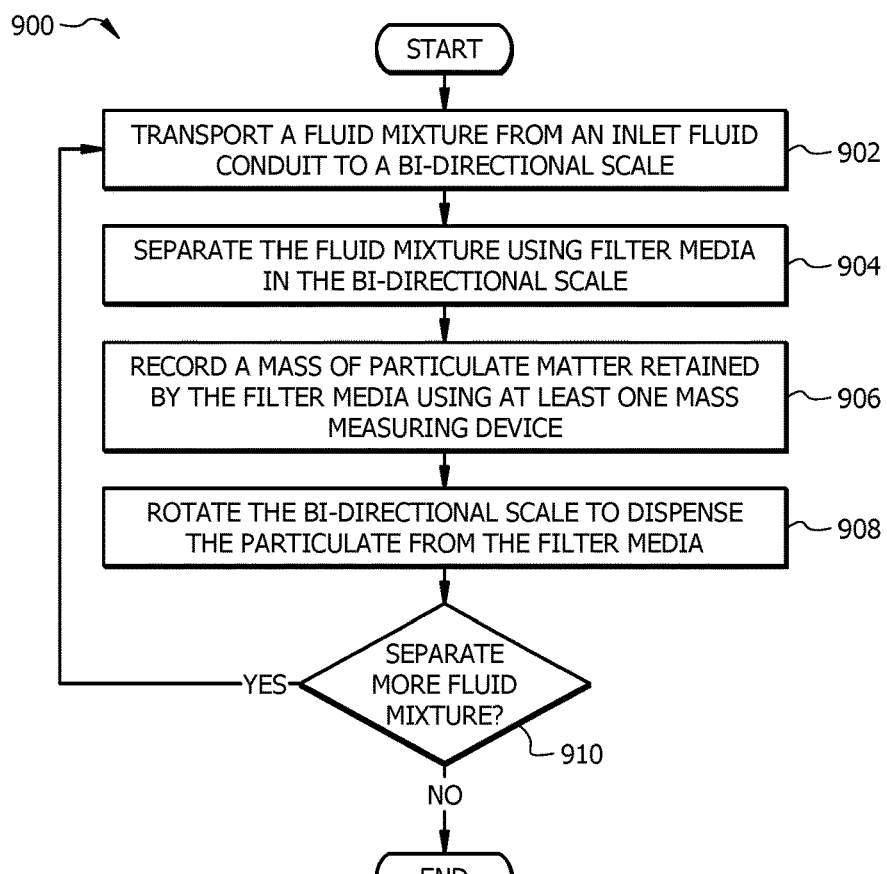
FIG. 9 is a flowchart of a method for operating the system of FIG. 1 according to some embodiments of the present disclosure.

FIG. 9 illustrates a method 900 for operating the system 100. The method 900 may begin at operation 902 which includes transporting a fluid mixture from an inlet fluid conduit 116 to a bi-directional scale 110, where the bi-directional scale comprises filter media 132 positioned between a first material receiving receptacle 134 and a second material receiving receptacle 136 positioned opposite the first material receiving receptacle 134. The operation 902 may occur periodically (e.g., is based on a cycle timer). In some embodiments, operation 902 occurs once every twenty minutes to an hour, e.g., one minute, every five minutes, every 10 minutes, every 20, every 30 minutes, every 40 minutes, every 50 minutes, every hour, every two hours, every three hours, every four hours, every five hours, every six hours, or every 12 hours. In some embodiments, operation 902 may be initiated based on a trigger event or a set-point measurement of an upstream process unit. For example, an upstream frac flowback separator may reach a set-point measurement (e.g., temperature, pressure, mass of sand) that initiates valve 140*a* to open. In some embodiments, the valve 140*a* remains open for a specified duration to fill the first material receiving receptacle 134.

At operation 904, the method 900 further includes separating the fluid mixture into particulate matter and filtrate using filter media 132 in the bi-directional scale 110, where at least a portion of the particulate matter is retained by the filter media and the filtrate passes through the filter media 132. Operation 904 may occur over a specified separation duration. Suitable separation durations may range from 30 seconds to 24 hours. For example, the separation duration may be at least 30 seconds, at least 1 minute, at least 2 minutes, at least 3 minutes, at least 4 minutes, at least 5 minutes, less than 6 minutes, less than 7 minutes, less than 8 minutes, less than 9 minutes, less than 10 minutes, less than 30 minutes, less than an hour, less than six hours, less than 12 hours, or less than 24 hours.

At operation 906, the method 900 further includes recording a mass of the particulate matter retained in the first material receiving receptable 134 using at least one mass measurement device 108. As discussed above, the mass may be recorded by pre-taring before operation or by subtracting a pre-recorded mass of the bi-directional scale 110 from the measured mass in a given cycle. At operation 908, following the separation duration, the method 900 includes rotating the bi-directional scale 110 about an axis of rotation 112 to dispense the particulate matter retained in the first material receiving receptacle 134, where following rotation of the bi-directional scale 110, the second material receiving receptacle 136 is configured to receive the fluid mixture from the inlet fluid conduit 116. Alternatively, dumping the particulate matter from the first material receiving receptacle may be initiated based on a set-point mass of particulate matter accumulated in the first material receiving receptacle 134 within a threshold (e.g., ±0.1% to 10% of the set-point mass). For example, operation 908 may be initiated once the set-point mass has been recorded by the at least one mass measuring device 108. In some embodiments, operation 908 may be initiated once a stable mass of the particulate matter in the first material receiving receptacle 134, e.g., the mass remains within 0.1% to 3% of the previous reading(s) over a duration. Once the set-point mass or a stabilized mass has been recorded, operation 908 may include rotating the bi-directional scale 110 about the axis of rotation 112 to dispense the particulate matter from the first material receiving receptacle 134 through the opening 114.

At decision block 910, the method 900 decides whether there is more fluid mixture to separate. As discussed above, the decision to separate more fluid mixture may be based on a pre-set cycle timer that delivers fluid mixture to the bi-directional scale 110 periodically. Alternatively, the decision to separate more fluid mixture may be based on a trigger event or a set-point measurement of an upstream process unit. For example, an upstream frac flowback separator may reach a set-point measurement (e.g., a set-point temperature, a set-point pressure, a set-point mass, etc.) that initiates the valve 140*a* to open to deliver the fluid mixture to the bi-directional scale 110. If yes, the method 900 repeats itself but does so by transporting the fluid mixture to the second material receiving receptacle 136. Operations 902-908 are repeated for the second material receiving receptacle 136. The method 900 may be repeated any number of times. If there is no more fluid mixture to separate, the method 900 ceases.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
   an outer frame;
   an inner frame coupled to the outer frame via at least one mass measurement device, the inner frame comprises an opening;
   an inlet fluid conduit;
   a bi-directional scale pivotally connected to the inner frame along an axis of rotation, the bi-directional scale comprising filter media positioned between a first material receiving receptacle and a second material receiving receptacle opposite the first material receiving receptacle, the first material receiving receptacle configured to receive a fluid mixture from the inlet fluid conduit, wherein the filter media separates the received fluid mixture into particulate matter that is retained, by the filter media, in the first material receiving receptacle and filtrate that passes through the filter media;
   a separator pivoting system coupled to the bi-directional scale, the separator pivoting system configured to:
   rotate the bi-directional scale about the axis of rotation, and following rotation of the bi-directional scale, the second material receiving receptacle is positioned to receive the fluid mixture from the inlet fluid conduit.

2. The system of claim 1, wherein the separator pivoting system is configured to rotate the bi-directional scale about the axis of rotation to dispense the particulate matter retained in the first material receiving receptacle through the opening in the inner frame.

3. The system of claim 1, wherein the separator pivoting system comprises:
   a first bearing frame and a second bearing frame each coupled to the inner frame and positioned on opposite sides of the bi-directional scale, each of the first and second bearing frames including a bearing and a rotatable shaft, wherein each of the respective rotatable shafts are coupled to the bi-directional scale; and an actuator coupled to one of the rotatable shafts, wherein the actuator is configured to rotate the bi-directional scale about the axis of rotation.

4. The system of claim 1, further comprising at least one splash guard that projects downward from a bottom surface of the inner frame and is positioned between the opening in the inner frame and the at least one mass measurement device.

5. The system of claim 1, wherein the filter media of the bi-directional scale is positioned between a first porous support structure and a second porous support structure, where the first porous support structure forms a floor surface in the first material receiving receptacle and the second porous support structure forms a floor surface in the second material receiving receptacle.

6. The system of claim 5, wherein the filter media is slidable between the first porous support structure and the second porous support structure, and wherein the filter media slides in and out of the bi-directional scale via an openable and closable door.

7. The system of claim 1, wherein a bottom surface of the inner frame includes recesses configured to receive the at least one mass measurement device.

8. The system of claim 1, comprising three mass measurement devices positioned on the outer frame in a triangular formation, wherein the three mass measurement devices couple the outer frame to the inner frame.

9. The system of claim 1, wherein the outer frame is a cubic frame having a first support beam and a second support beam that each extends across opposing faces of the cubic frame, and wherein the inlet fluid conduit is coupled to the first support beam and the second support beam.

10. The system of claim 1, wherein a bottom portion of the outer frame includes telescopic adjustable legs that extend and contract.

11. The system of claim 1, further comprising:
a valve configured to regulate the flow rate through the inlet fluid conduit;
a processor communicatively coupled to the valve, the separator pivoting system, and the at least one mass measurement device, the processor configured to:
open the valve in the inlet fluid conduit to dispense the fluid mixture into the first material receiving receptacle;
close the valve in the inlet fluid conduit to allow the filter media to separate the fluid mixture into the particulate matter and the filtrate;
record the mass of the particulate matter in the first material receiving receptacle;
operate the separator pivoting system to rotate the bi-directional scale about the axis of rotation to dispense the particulate matter from the first material receiving receptacle through the opening in the inner frame;
open the valve in the inlet fluid conduit to dispense the fluid mixture into the second material receiving receptacle;
close the valve in the inlet fluid conduit to allow the filter media to separate the fluid mixture into the particulate matter and the filtrate;
record the mass of the particulate matter in the second material receiving receptacle; and
operate the separator pivoting system to rotate the bi-directional scale about the axis of rotation to dispense the particulate matter from the second material receiving receptacle through the opening in the inner frame.

12. A system comprising:
an outer frame;
an inner frame coupled to the outer frame via at least one mass measurement device, the inner frame having an opening;
an inlet fluid conduit coupled to the outer frame;
a bi-directional scale pivotally connected to the inner frame along an axis of rotation, the bi-directional scale comprising a first material receiving receptacle, a second material receiving receptacle positioned opposite the first material receiving receptacle, and filter media positioned between the first material receiving receptacle and the second material receiving receptacle; and
a separator pivoting system comprising an actuator and a processor, wherein the processor is configured to rotate the bi-directional scale along the axis of rotation using the actuator.

13. The system of claim 12, wherein the separator pivoting system comprises:
a first bearing frame and a second bearing frame positioned on opposite sides of the bi-directional scale, each of the first and second bearing frames comprising a bearing and a rotatable shaft, wherein each of the respective rotatable shafts are coupled to the bi-directional scale; and
wherein the actuator is coupled to one of the rotatable shafts.

14. The system of claim 12, wherein the filter media of the bi-directional scale is positioned between a first porous support structure and a second porous support structure, where the first porous support structure forms a floor surface in the first material receiving receptacle and the second porous support structure forms a floor surface in the second material receiving receptacle.

15. The system of claim 14, wherein the filter media is slidable between the first porous support structure and the second porous support structure, and wherein the filter media slides in and out of the bi-directional scale via an openable and closable door.

16. A method comprising:
receiving a fluid mixture in a bi-directional scale from an inlet fluid conduit, the bi-directional scale comprising filter media positioned between a first material receiving receptacle and a second material receiving receptacle positioned opposite the first material receiving receptacle, the first material receiving receptacle configured to receive the fluid mixture from the inlet fluid conduit;
separating the fluid mixture into particulate matter and filtrate via the filter media, wherein at least a portion of the particulate matter is retained, by the filter media, in the first material receiving receptacle and the filtrate passes through the filter media;
recording a mass of the particulate matter using at least one mass measurement device;
rotating the bi-directional scale about an axis of rotation to dispense the particulate matter retained in the first material receiving receptacle, and wherein following rotation of the bi-directional scale, the second material receiving receptacle is configured to receive the fluid mixture from the inlet fluid conduit.

17. The method of claim 16, wherein the receiving the fluid mixture to the bi-directional scale occurs periodically and is initiated based on a cycle timer.

18. The method of claim 17, wherein the cycle timer is from one minute to 12 hours.

19. The method of claim 16, wherein the separating the fluid mixture into particulate matter and filtrate occurs over a separation duration.

20. The method of claim 19, wherein the separation duration is from 30 seconds to 24 hours.

\* \* \* \* \*